July 11, 1939.  R. W. DOEG  2,165,619
PISTON
Filed July 10, 1937
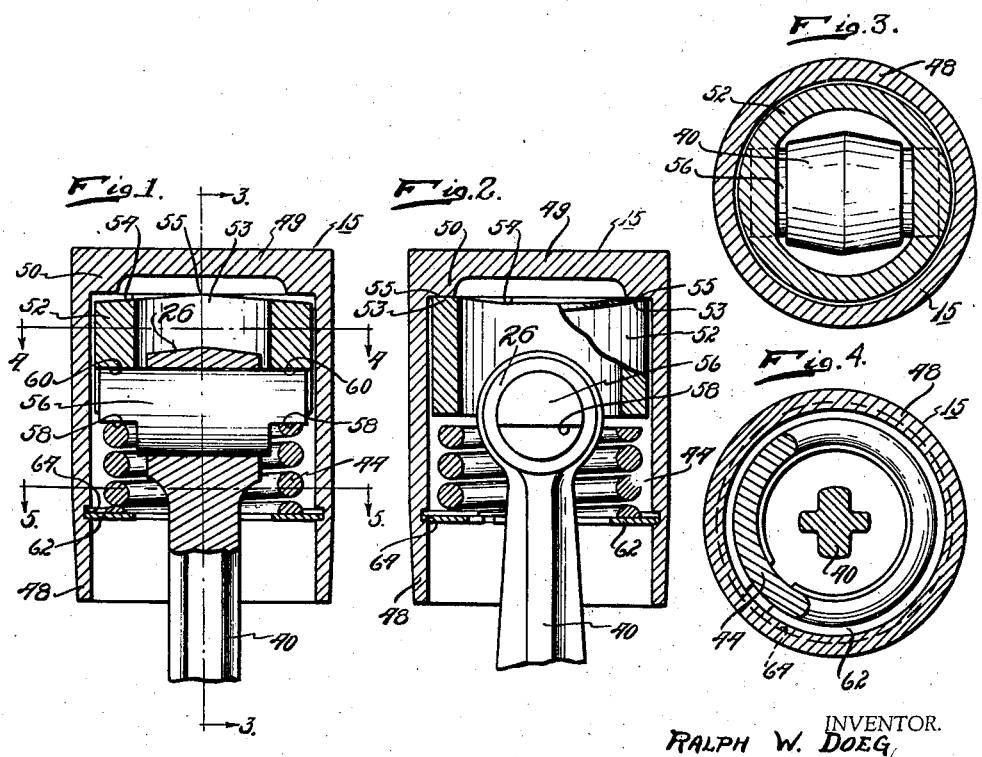
INVENTOR.
RALPH W. DOEG
BY Ralph E. Baker
ATTORNEY.

Patented July 11, 1939

2,165,619

UNITED STATES PATENT OFFICE 2,165,619

PISTON

Ralph W. Doeg, Detroit, Mich., assignor to Nash-Kelvinator Corporation, Detroit, Mich., a corporation of Maryland Application July 10, 1937, Serial No. 153,020

4 Claims. (Cl. 309—16)

This invention relates to pistons and more particularly for compressors employed in refrigerant apparatus.

The invention consists of a hollow piston, and mounted therein is a sleeve or member which is fulcrumed on the head of the piston for oscillatory or rocking movement. A wrist pin is journaled on the sleeve or member, to which a pitman is connected, and the wrist pin and sleeve are held within the piston by spring means carried by the piston. The spring means exerts a pressure on the elements which tends to cause the head of the piston to be drawn toward the sleeve and wrist pin.

This assembly allows for a free movement of the piston with respect to the wrist pin and its connecting pitman, as the sleeve has a fulcrum engagement with the head, and the wrist pin a pivotal movement with respect to the sleeve.

Further objects and advantages of the present invention will be apparent from the following description, reference being had to the accompanying drawing, wherein a preferred form of the present invention is clearly shown.

In the drawing:

Fig. 1 is a vertical sectional view of the invention;

Fig. 2 is a sectional view taken substantially on line 3—3 of Fig. 1;

Fig. 3 is a sectional view taken substantially on line 4—4 of Fig. 1; and

Fig. 4 is a sectional view taken substantially on line 5—5 of Fig. 1.

The piston 15 comprises, in general, a skirt 48 and a head portion 49. Provided on the undersurface of the head 49 adjacent to the inner peripheral circumference of the skirt 48 is an abutment shoulder 50. Mounted within the skirt 48 is a loose fitting sleeve 52 that is provided with a tapered end 53 for abutment at 55 against the undersurface 54 of the shoulder 50. The tapered end 53 converges to a sharp diametrical line to serve as a fulcrum against the surface 54 for relative movement between piston and sleeve. Centrally journalled on the wrist pin 56 is the upper end or pitman arm 26 of a pitman 40. The ends of the wrist pin are cut away as at 58 to provide for flat surfaces engageable by a spring 44 to hold the ends in the semi-circular pockets 60 formed in the opposite end of the sleeve 52 as well as to maintain the sleeve in continuous engagement with the shoulder 50 of the piston 15. The opposite end of the spring 44 presses against a split ring 62 that rests in a groove 64 formed in the inner periphery of the skirt 48.

It will be noted that the axial direction of the wrist pin 56 is placed at right angles to the fulcrum point of the sleeve 52 so that there is provided a form of universal movement between pitman arm and piston. Though the fulcrum point is illustrated as being positioned diametrically on the sleeve, it is obvious that it may be offset if it becomes desirable to provide for greater movement in one direction.

The spring 44 is of such a tension as to continuously hold the wrist pin, sleeve and piston in a firm relative assembled position. But the tension of the spring is weak enough not to deter the wrist pin and sleeve from pivotal movement as an assembly relative to the piston 15 to conform to the angular movement of the pitman arm, the assembly of the sleeve 52, wrist pin 56 and spring 44, forms a unit which is capable of movement within the piston, yet the piston may have relative movement with respect to this assembly unit, because the wrist pin and sleeve are held through the pitman 40 against certain movements without interfering with movements of the piston. The piston is simply supported upon the sleeve 52 by the fulcrum connection, and held on such fulcrum by means of the spring 44. The spring 44 allows the sleeve 52 to have a rocking movement within the skirt of the piston, and the pitman may also have a movement by means of the wrist pin with respect to the sleeve. By having the sleeve move conjointly with the wrist pin to keep it at all times in alignment with the pitman arm, there is eliminated any tendency for distortion on the bearing surface of the wrist pin. Thus, there is not only an elimination of unnecessary wear, but a provision for a smoother functioning of relative parts.

It is further obvious that by the above arranged parts, the piston will be free in its reciprocal actions of all undue stress occasioned by misalignment due to faulty assembly or undue wear of parts.

Although only a preferred form of the invention has been illustrated, and that form described in detail, it will be apparent to those skilled in the art that various modifications may be made therein without departing from the spirit of the invention or from the scope of the appended claims.

I claim:

1. The combination of a piston having a head and a skirt, a member positioned within said skirt and fulcrumed on said head to permit said member to have a rocking movement, said member having pockets formed therein, a wrist pin received in said pockets, and having the axis thereof disposed at right angles to the axis of the fulcrum for said member, and a spring means mounted in said skirt and engaging said wrist pin for continuously urging said head toward said member and wrist pin.

2. The combination of a piston having a head and a skirt, and a wrist pin carrying member positioned within said skirt and having fulcrumed engagement with said head to permit relative movement of said member and head, and means for maintaining said member and head in fulcrumed engagement.

3. The combination of a piston having a head and a skirt, and a wrist pin carrying member positioned within said skirt and having fulcrumed engagement with said head to permit relative movement of said member and head, and spring means urging said head towards said member.

4. The combination of a piston having a head and a skirt, and a wrist pin carrying member positioned within said skirt and having fulcrumed engagement with said head to permit relative movement of said member and head, and means for maintaining said member and head in fulcrumed engagement, said member being provided with a wrist pin, the wrist pin axis and the fulcrum axis being at right angles to each other.

RALPH W. DOEG.